(No Model.)

J. BRICK.
HORSE BLINDFOLD.

No. 327,762. Patented Oct. 6, 1885.

WITNESSES:

INVENTOR:
J. Brick
BY Munn & Co
ATTORNEYS.

UNITED STATES PATENT OFFICE.

JAMES BRICK, OF CLIFTON, NEW JERSEY.

HORSE-BLINDFOLD.

SPECIFICATION forming part of Letters Patent No. 327,762, dated October 6, 1885.

Application filed July 31, 1885. Serial No. 173,154. (No model.)

*To all whom it may concern:*

Be it known that I, JAMES BRICK, of Clifton, in the county of Passaic and State of New Jersey, have invented a new and Improved Horse-Blindfold, of which the following is a full, clear, and exact description.

My invention consists, principally, of a cheap and convenient blindfolding device, to be kept about stalls for blindfolding a horse in case of fire, so he can be led out from the burning building.

The invention also consists in providing the blindfolding device with a muzzle or covering for the nostrils and mouth of the horse, so that he will not become unmanageable from inhaling heat and smoke.

The invention finally consists of the construction, arrangement, and combination of parts, all as hereinafter described and claimed.

Reference is to be had to the accompanying drawings, forming part of this specification, in which similar letters of reference indicate corresponding parts in both the figures.

Figure 1:
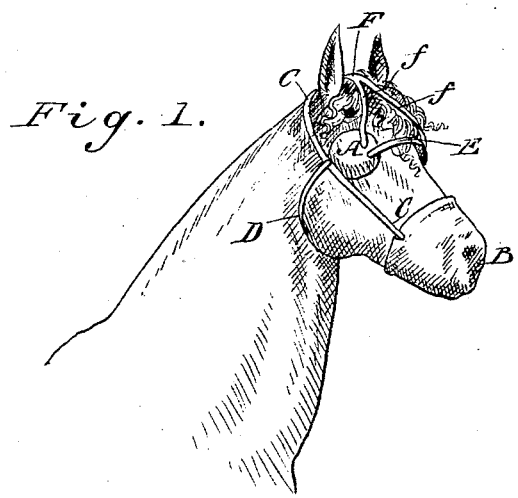
Figure 2:
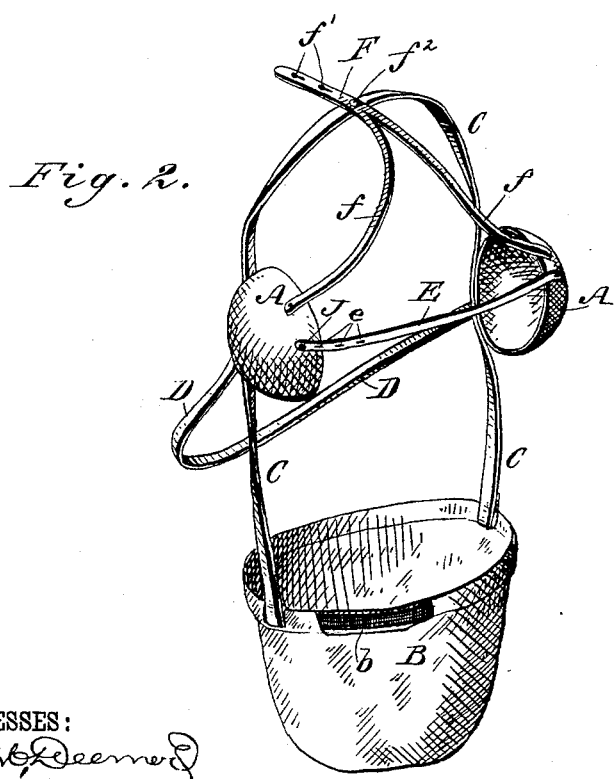

Figure 1 illustrates the use of my new and improved horse blindfolding device, and Fig. 2 is a perspective view of the device.

A A represent the blinders for covering the eyes of the horse, and B represents the muzzle or cover for the mouth and nostrils of the horse. The muzzle B is by preference made of canvas or other fabric, and is in bag-form, and attached to the ends of the strap C. At its upper edge the muzzle is provided, by preference, with an elastic band, $b$, to cause it to fit closely around the jaws and lower part of the horse's head, to exclude smoke and heat. The strap C is of a length to pass over the horse's head, as shown in Fig. 1, and the blinders A are attached to it in such position that they stand in line with the horse's eyes when the strap C is placed upon the horse's head.

The blinders A may be of any suitable form and material, but I prefer to make them saucer-shaped or semispherical and of soft india-rubber, so they will fit over the horse's eyes, and exclude the light, and effectually blindfold him.

The strap C may be held upon the horse's head by the throat-strap D, but this may be dispensed with, if desired.

The blinders A are connected together in this instance by a strap, E, which is provided with a series of holes, $e$, to receive a buckle-tongue or the button J, so the blinders may be adjusted to suit different horses and made to always, preferably, cover the eyes.

To prevent the blinders from falling down too low below the horse's eyes, I support them in the proper position by the head-strap F attached to the center of the strap C, and divided to form the short straps $ff$, each attached to one of the blinders A, as shown.

The upper or rear portion of the strap F has several holes, $f'$, formed in it to receive a buckle-tongue or the button $f^2$, so the strap may be adjusted to raise or lower the blinders to fit them properly to the eyes of the horse.

Having thus described my invention, what I claim as new, and desire to secure by Letters Patent, is—

1. As a new article of manufacture, a horse-blindfolding device provided with blinders A A, and muzzle B, attached to the main head-strap C of the device, substantially as and for the purposes set forth.

2. The device herein shown and described, consisting of the strap C, having muzzle B and blinders A attached to it, in combination with the strap E, connecting the blinders and strap F, for supporting them, as set forth.

JAMES BRICK.

Witnesses:
J. EMMETT STOUTENBURGH,
MARTIN KOERT.